US008256794B1

(12) United States Patent
Burton et al.

(10) Patent No.: US 8,256,794 B1
(45) Date of Patent: Sep. 4, 2012

(54) CONVERTIBLE DEER CART

(76) Inventors: Roger A. Burton, Rice, MN (US); John R. Hendrickson, Rice, MN (US)

( * ) Notice: Subject to any disclaimer, the term of this patent is extended or adjusted under 35 U.S.C. 154(b) by 0 days.

(21) Appl. No.: 13/171,409

(22) Filed: Jun. 28, 2011

(51) Int. Cl.
*B62B 1/12* (2006.01)
(52) U.S. Cl. ..... 280/656; 280/638; 280/35; 280/47.131; 280/47.17
(58) Field of Classification Search ................ 280/7.15, 280/200, 202, 204, 205, 288.4, 638, 35, 639, 280/651, 652, 656, 43.1, 47.131, 47.17, 47.18, 280/47.19, 47.24, 47.26, DIG. 11
See application file for complete search history.

(56) References Cited

U.S. PATENT DOCUMENTS

| 4,045,040 | A | * | 8/1977 | Fails | 280/1.5 |
| 6,688,429 | B2 | * | 2/2004 | McKay | 182/127 |
| 6,811,180 | B1 | * | 11/2004 | Molliere | 280/652 |

* cited by examiner

*Primary Examiner* — Hau Phan
*Assistant Examiner* — Bryan Evans
(74) *Attorney, Agent, or Firm* — Albert W. Watkins

(57) ABSTRACT

A hand-propelled or vehicle-towed convertible deer cart incorporates side walls that are locked vertically when collapsed to a first geometry of very small size for storage and transport, and also when readily reconfigured for use as a larger transport cart or trailer. When further reconfigured for use as a hunting stand, the side walls are pivoted from vertical to horizontal and form a part of a larger platform in combination with the cart bed. A pair of ladders may be stored within the cart bed when configured as a transport cart. The ladders are pivoted about their longitudinal axis to convert to the larger transport cart, and then extended to full-length ladders in the hunting stand geometry.

5 Claims, 13 Drawing Sheets

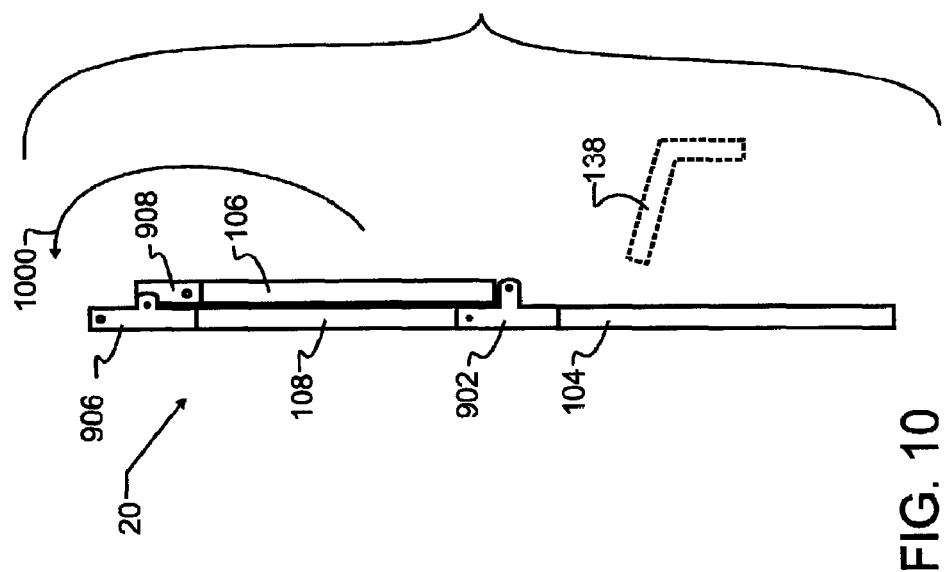
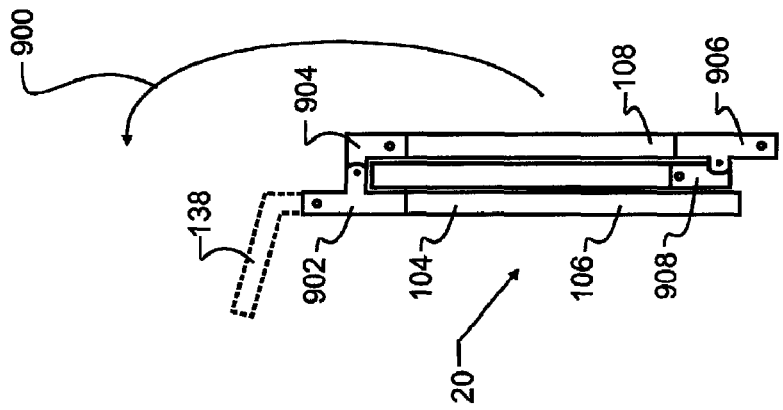
FIG. 10
FIG. 9

CONVERTIBLE DEER CART

BACKGROUND OF THE INVENTION

1. Field of the Invention

The present invention pertains generally to land vehicles that are wheeled and convertible, which may be stabilized and handle-propelled by an attendant or alternatively articulated with a towing vehicle, and having laterally spaced wheels and a receptacle body. In a more specific manifestation, the invention pertains to a hand-propelled or vehicle-towed cart which may be collapsed to very small size for storage and transport, and may further be readily reconfigured for use as a transport cart or trailer, and may further be reconfigured for use as a hunting stand.

2. Description of the Related Art

At least some early civilizations, at or predating recorded times, were believed to be relatively nomadic, generally traveling about over relatively large distances both hunting and gathering food. In many cases, early records suggest that man used simple clubs, spears and other basic tools to assist with hunting. There are locations where early man may have also used natural features such as cliffs or the like off which individual animals or herds may have been driven. These types of hunting techniques required very close range or proximity with the hunted animals, and so could be expeditiously conducted at nearly any location, even in relatively close proximity with a permanently-located or temporary village or residence.

More modern equipment has been developed that permits a hunter to be at substantially greater distances from the game being hunted. Exemplary equipment includes various firearms such as rifles and pistols which will fire ammunition hundreds or even thousands of yards. These modern firearms enable a hunter to seek out a relatively concealed location, and then wait for game to pass within reasonable shooting range. The hunter will commonly travel to and from a relatively remote hunting location, and remain relatively stationary there. A hunter may also preferably set up at a small elevation above the ground. This elevation often provides the hunter with a broader view, and may also in some situations reduce the likelihood of being seen or smelled by the game. The elevation also may provide a better shooting angle, depending upon the surrounding topography. A portable stand permits improved hunting in changing locations or in locations where it is not possible or feasible to set up a permanent stand.

A modern hunter will also frequently bring with additional hunting equipment beyond the primary weapon, which might for exemplary purposes be a bow or firearm. The hunter may prefer to bring items of safety, convenience and recreation, such as flashlights, survival kits, food and beverages, different firearms, extra munitions, knives or other cleaning or butchering tools, game calls, extra garments for varying temperatures and possible precipitation, camping gear, binoculars, and many other diverse items selected by an individual hunter as being desirable. If game is in fact killed or bagged, the game will need transported out from the remote location, along with any supplies not yet consumed or spent. Since some hunting locations may be accessible by motorized vehicle and others may only be accessed on foot, it is desirable to enable a hunter to easily transport as much or as little gear as the hunter may prefer, using whatever method is most convenient and desired for a given hunting location.

Once the hunt is finished, many hunters may drag any harvested game from the remote hunting location, either manually or with the assistance of a motorized vehicle such as an All-Terrain Vehicle (ATV) or the like. Unfortunately, manually dragging a larger animal is extremely strenuous, and is harmful to the hide or pelt of the animal. An ATV relieves the manual effort, but still requires that the animal be carefully secured, and the hide or pelt will still be harmed.

Artisans have heretofore recognized the desirability of porting supplies into and out of a remote location, along with porting any killed game out of the remote location. The broader concept of a convertible cart and hunting stand is disclosed, for exemplary purposes in U.S. Pat. No. 6,186,271 by Borries et al, entitled "Hunting stand and game carrier," the teachings which are incorporated herein by reference. This patent describes a convertible cart and stand which allegedly may collapse for storage, but there is no illustration of how the components are rearranged to enable the deployed and collapsed positions.

A large number of additional patents illustrate other prior art carts and platforms, the teachings of each which are additionally incorporated herein by reference, including: U.S. Pat. No. 2,732,118 by Reinhardt, entitled "Movable elevated work platform supporting structure;" U.S. Pat. No. 3,282,375 by Ray, entitled "Mobile stand for hunters convertible to a hand cart;" U.S. Pat. No. 3,289,787 by McSwain, entitled "Collapsible hunting shelter;" U.S. Pat. No. 3,336,999 by McSwain, entitled "Hunting stand;" U.S. Pat. No. 3,352,379 by Riggs, entitled "Combination tree stand and game cart;" U.S. Pat. No. 3,353,629 by Brunes, entitled "Pack frame and tree seat structure;" U.S. Pat. No. 3,422,923 by Lund, entitled "Convertible combination platform and step for ladders;" U.S. Pat. No. 3,954,155 by Guidara, entitled "Stepladder dolly;" U.S. Pat. No. 4,045,040 by Fails, entitled "Deer stand and game carrier;" U.S. Pat. No. 4,321,982 by Strickland, entitled "Tree climbing-hunting and game cart device;" U.S. Pat. No. 4,373,737 by Cory et al, entitled "Game carrier;" U.S. Pat. No. 4,428,456 by Rohde, entitled "Lookout convertible to a compact dolly;" U.S. Pat. No. 5,064,020 by Eagleson, entitled "Device for hunting large and small game;" U.S. Pat. No. 5,105,908 by Freund, entitled "Ladder treestand and trailer rit;" U.S. Pat. No. 5,236,062 by Laney, entitled "ATV support rack apparatus;" U.S. Pat. No. 5,253,732 by Daniels, entitled "Portable folding tree stand;" U.S. Pat. No. 5,295,556 by Mullin, entitled "Multipurpose hunting cart;" U.S. Pat. No. 5,328,192 by Thompson, entitled "Manual pull-type carrier for transporting a large game carcass;" U.S. Pat. No. 5,492,196 by Michno, entitled "Portable deer cart and tree stand;" U.S. Pat. No. 5,564,720 by Stringer, entitled "Portable game cart;" U.S. Pat. No. 5,566,780 by Bambrough, entitled "Ladder-based cart apparatus;" U.S. Pat. No. 5,624,008 by Beardslee, entitled "Convertible tree stand;" U.S. Pat. No. 5,673,928 by Jury, entitled "Folding portable cart;" U.S. Pat. No. 5,687,978 by Rhodes et al, entitled "Foldable load conveyance apparatus;" U.S. Pat. No. 5,740,882 by Griffith et al, entitled "Combination hunting stand and game carrier apparatus;" U.S. Pat. No. 5,839,538 by Magyar, entitled "Foldable portable tree stand;" U.S. Pat. No. 5,873,582 by Kauffman et al, entitled "Convertible hunting utility cart;" U.S. Pat. No. 5,887,676 by Harbin, entitled "Accessory for allowing use of a tree stand as a game carrier;" U.S. Pat. No. 6,053,278 by Myers, entitled "Multiple use convertible elevated stand and cart;" U.S. Pat. No. 6,095,284 by Smith, entitled "Elevatable stands for physically challenged hunters;" U.S. Pat. No. 6,260,864 by Smith, entitled "Game transporting system;" U.S. Pat. No. 6,308,968 by Hollingsworth, entitled "Collapsible hunting cart apparatus;" U.S. Pat. No. 6,341,787 by Mason, entitled "Rough terrain carrier;" U.S. Pat. No. 6,375,200 by Harter, entitled "Wheeled carrier and seat assembly for use while hunting with decoys;" U.S. Pat. No. 6,481,529 by Voorhies, entitled "Climbing tree stand;" U.S. Pat. No. 6,505,707 by Berry, entitled "Combination tree stand, blind and equipment carrier;" U.S. Pat. No. 6,557,867 by Angstadt, entitled "Portable multi-activity outdoor recreation apparatus;" U.S. Pat. No. 6,561,529 by Darling, entitled "Versatile portable cart;" U.S. Pat. No. 6,688,635 by Watts, entitled "Multi-purpose deer-hunting cart;" U.S. Pat. No. 6,811,180 by Molliere, entitled "Combination work and recreation cart;" U.S. Pat. No. 7,017,939 by Darling, entitled "Versatile portable cart;" U.S. Pat. No. 7,185,737 by Smith et al, entitled "ATV accessories;" and U.S. Pat. No. 7,296,959 by Davis, entitled "Deer stand and deer carrier rack for an ATV." Additionally, Webster's New Universal Unabridged Dictionary, Second Edition copyright 1983, is incorporated herein by reference in entirety for the definitions of words and terms used herein.

SUMMARY OF THE INVENTION

In a first manifestation, the invention is a wheeled and convertible deer cart having laterally spaced wheels; and a receptacle body having a bed and side walls that extend generally perpendicular to the bed in a first configuration and a second configuration, and which are pivotal to extend generally parallel to the bed in a third configuration. A pair of ladders are received within the bed in the first configuration, the pair of ladders pivotal and spaced distally at opposed ends of the bed in a second configuration and also in the third configuration. The ladders are compacted in the second configuration and extended in the third configuration. The first configuration defines a utility cart, the second configuration defines a utility cart larger than the first configuration, and the third configuration defines a stand.

In a second manifestation, the invention is, in combination, an articulated transport cart and human harness. The articulated transport cart has at least two ground traversing wheels; a bed carried upon the ground traversing wheels; and a ball receiver coupled to the bed and moveable therewith. The human harness has a body member engaging a human body and moveable therewith; and a ball coupled to the body member. The ball and ball receiver are coupled for relative motion therebetween.

In a third manifestation, the invention is a wheeled cart convertible between a compact trailer geometry, a deer cart geometry, and a deer stand geometry. The cart has a load-supporting bed. At least one side wall adjacent to the load-supporting bed is pivotal with respect thereto between coplanar with the load-supporting bed and perpendicular thereto. At least one wheel is supported by the at least one side wall and is pivotal therewith respect to the load-supporting bed. At least one ladder is adjacent the load-supporting bed and pivotal with respect thereto. At least one leg member is supporting the at least one ladder at an angle with respect to the load-supporting bed.

OBJECTS OF THE INVENTION

Exemplary embodiments of the present invention solve inadequacies of the prior art by providing a hand-propelled cart which may be collapsed to very small size for storage and transport, and may further be readily reconfigured for use as a transport cart or trailer, and may further be reconfigured again for use as a hunting stand.

A first object of the invention is to provide a mobile cart that may be propelled by a human operator through rough terrain, underbrush, and woods, and which may be used to transport game, equipment, injured individuals, and other diverse and potentially heavy loads. A second object of the invention is to provide alternative methods of coupling to a source of motive power, including the provision of both human push-pull and motive vehicular couplings to permit a hunter to access a hunting location by either walking or driving a motorized vehicle, while still enjoying the remaining benefits of the present invention. Another object of the present invention is to enable a hunter to actively hunt while transporting a cart designed in accord with the teachings of the present invention. A further object of the invention is to enable a completely self-contained generally rectangular utility trailer to be quickly and easily converted to a mobile cart suitable for transporting large game and other objects, and further to a free-standing stand of sufficient height to permit hunting deer or other game therefrom, preferably manually without the need for tools.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, in which:

FIGS. 9-11 illustrate the extension of front ladder 20 from a fully folded configuration of FIG. 9 such as found in FIGS. 1, 2 and 4-8 to a partially folded configuration of FIG. 10, to a fully extended configuration of FIG. 11 as found in FIG. 3, each from side plan view.

DESCRIPTION OF THE PREFERRED EMBODIMENT

Figure 1:
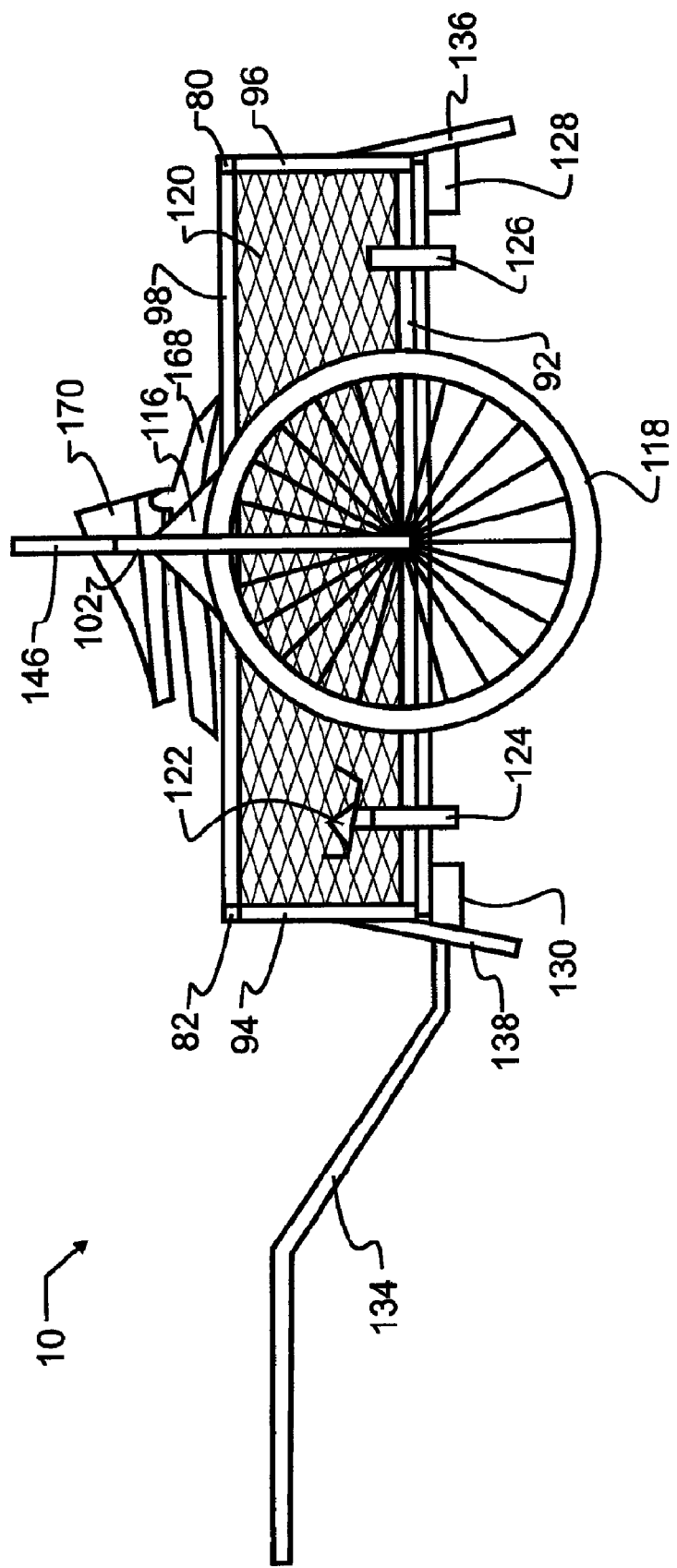
FIG. 1 illustrates a preferred embodiment convertible deer cart configured in a utility cart geometry in accord with the teachings of the present invention from a side plan view.
Figure 4:
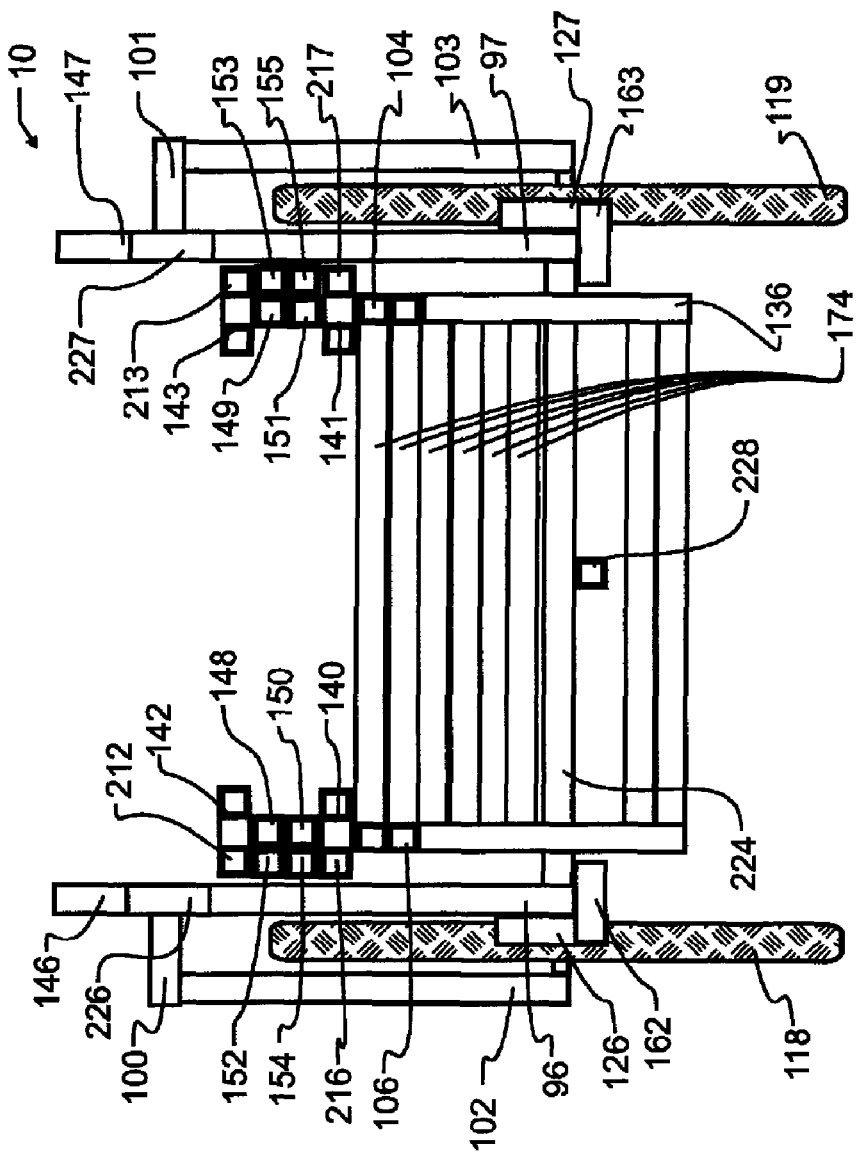
FIG. 4 illustrates the preferred embodiment convertible deer cart of FIG. 1 configured in a utility cart geometry in accord with the teachings of the present invention from a rear plan view.

FIG. 1 illustrates a preferred embodiment convertible deer cart configured in a utility cart geometry 10. A tongue 134 may optionally be provided to couple to motorized vehicles through a typical hitch pin, or through any other suitable coupling technique, to the balance of the utility cart geometry 10. Side wall 120 is, for exemplary purposes and not limited thereto, fabricated from expanded metal. Defining the boundaries of side wall 120 are boundary members 92, 94, 96, and 98. Extending in a plane generally parallel to side wall 120 is wheel 118. Vertical wheel support member 102 extends generally about wheel 118, and in the preferred embodiment may serve as one anchor point for an axle (visible in FIG. 4) extending through wheel 118. Vertical wheel support member 102 forms a right angle coupling with horizontal wheel support member 100, which in turn terminates at coupling 226 (visible in FIG. 4). Coupling 226 may slide upon member 146 and may therefore be removed vertically therefrom. Coupling 226 may further be pinned, bolted, or otherwise fastened to member 146 to lock the two in relative position. In the preferred embodiment, all connections are made using wire lock pins where the pin passes through appropriate holes in each member to be coupled, and a wire loop wraps around the pin to secure the pin against disconnect. The wire lock pins may be further secured against accidental drop or loss through wire lanyards or the like anchored to adjacent members. Wire lock pins with or without lanyards are well known in the hardware industry, and combine ease of installation with secure fastening while simultaneously not requiring any tools for fastening or removal.

Figure 3:
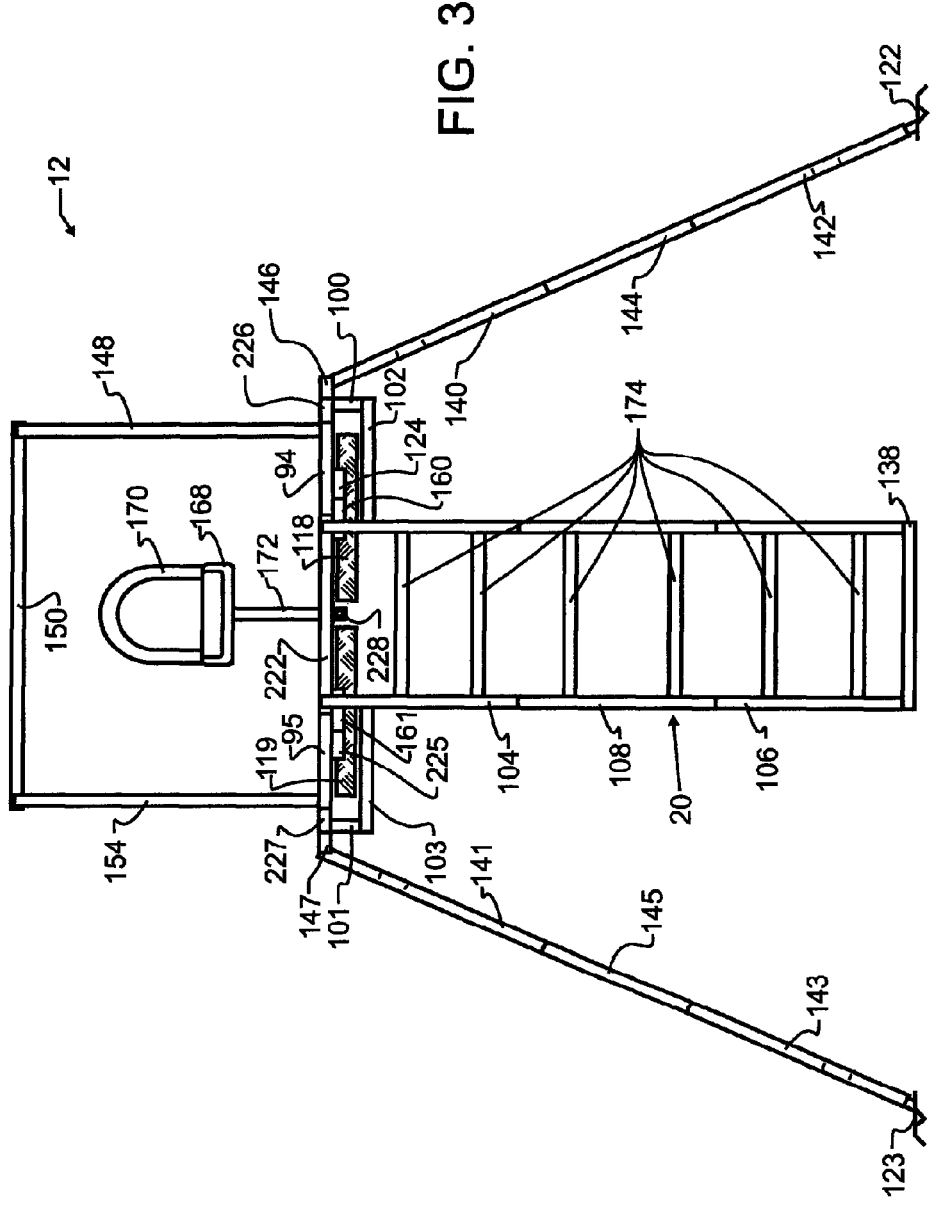
FIG. 3 illustrates the preferred embodiment convertible deer cart of FIG. 1 reconfigured to a free-standing deer stand geometry in accord with the teachings of the present invention from a front plan view.

Riser members 124, 126 extend partially vertically along side wall 120, and are used to form a pivotal coupling with members 160, 162, respectively, to permit side wall 120 to be pivoted from the vertical configuration shown in FIG. 1 to the horizontal configuration shown in FIG. 3. As also visible in FIG. 3, and also apparent from FIG. 4, there are corresponding components on the opposite side of utility cart geometry 10, including side walls 121, boundary members 93, 95, 97, 99, wheel 119, vertical wheel support member 103, horizontal wheel support member 101, coupling 227, member 147, riser members 125, 127 and members 161, 163, each which operate in exactly the same manner as the even numbered counterparts generally visible in the side view of FIG. 1.

Continuing with the description of components visible in FIG. 1, riser members 124, 126 may optionally serve as a temporary holder for feet 122, 123 ultimately used in the free-standing deer stand configuration 12 of FIG. 3. To help maintain member 146 in vertical orientation shown in FIG. 1 relative to boundary member 98, a reinforcing triangle 116 is further provided. Pockets 80 and 82 may additionally be provided, for exemplary purposes fabricated from square tubing with the center opening extending longitudinally parallel to the ground and normal (perpendicular) to the plane of the paper.

As may be apparent from FIG. 1, this utility cart configuration 10 defines a space between wheels 118, 119 in which various cargo may be carried. In most applications, unused components will additionally be carried in the space between wheels 118, 119. This will include ladders 20, 30, terminating respectively with terminations 138, 136, each visible at least in part in FIG. 1, and also various members 140-143, and 148-155 visible in FIG. 4. A seat bottom 168 and top 170 are pivotally interconnected, and will ultimately find utility in deer stand configuration 12 illustrated in FIGS. 3 and 15. Likewise, a pair of stops 128, 130 are visible in FIG. 1, again finding utility as ladder pivot stops in the deer stand configuration 12 illustrated in FIG. 15.

Figure 2:
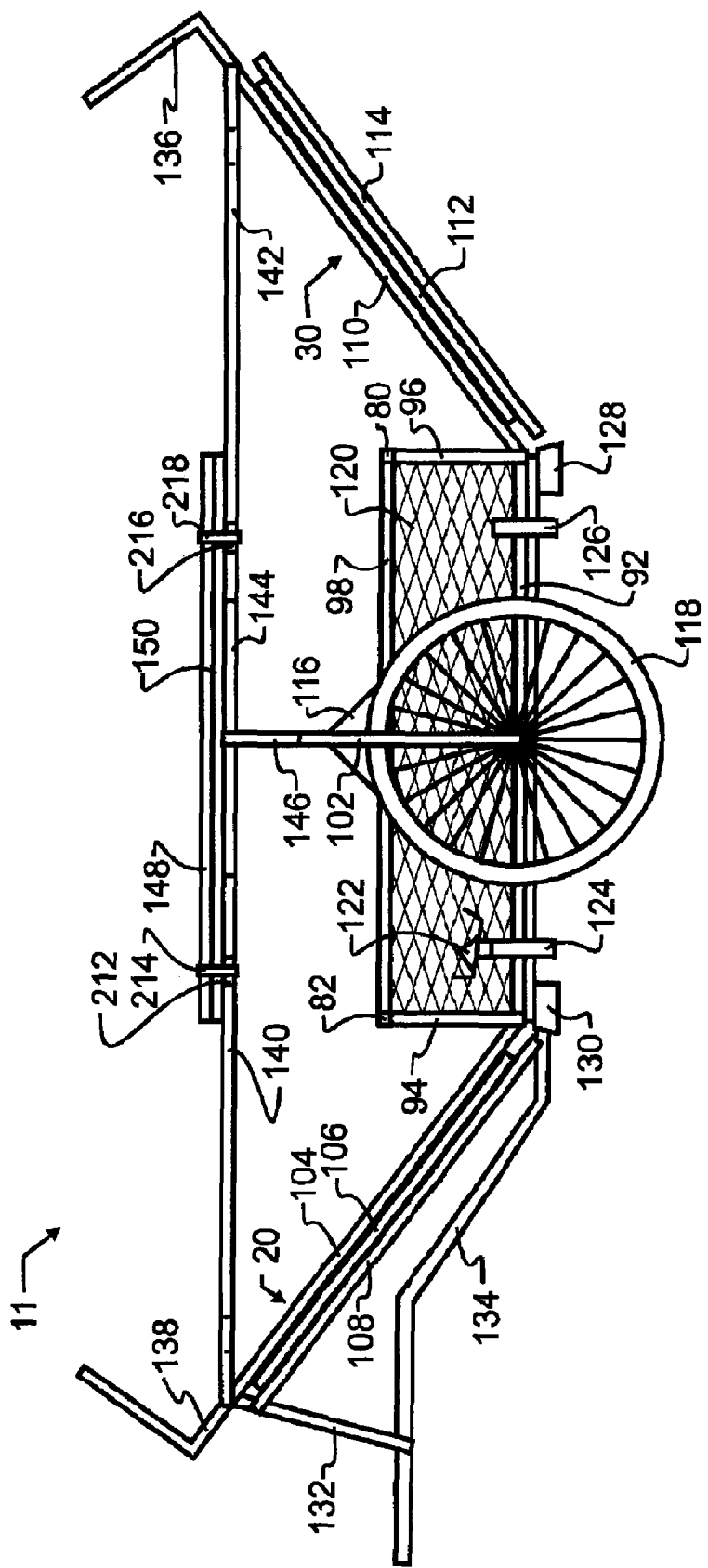
FIG. 2 illustrates the preferred embodiment convertible deer cart of FIG. 1 reconfigured to a deer transport cart geometry in accord with the teachings of the present invention from a side plan view.
Figure 5:
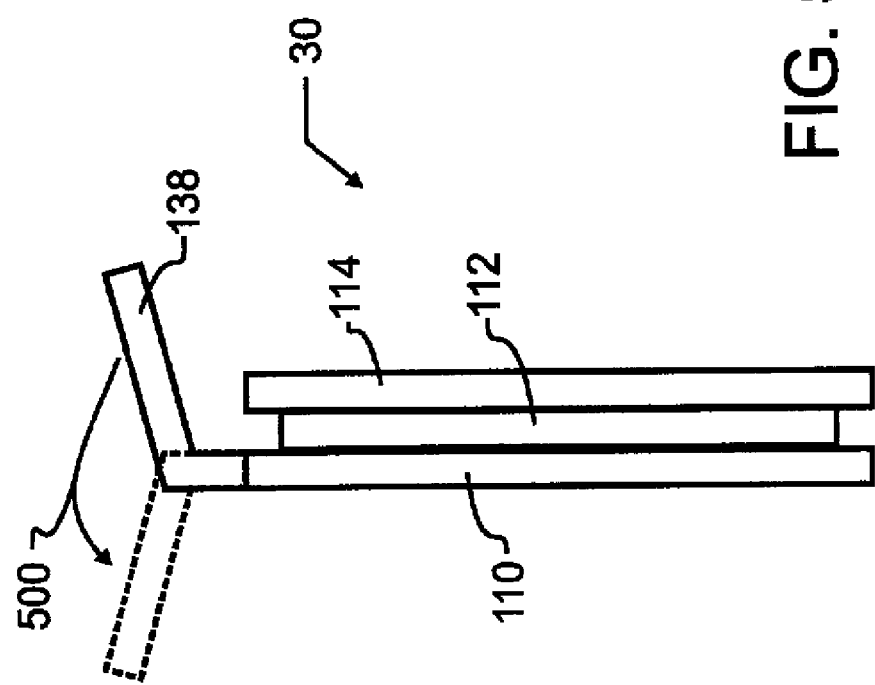
FIG. 5 illustrates alternative positioning of the front ladder termination, visible for exemplary purposes in FIGS. 1 and 2.
Figure 6:
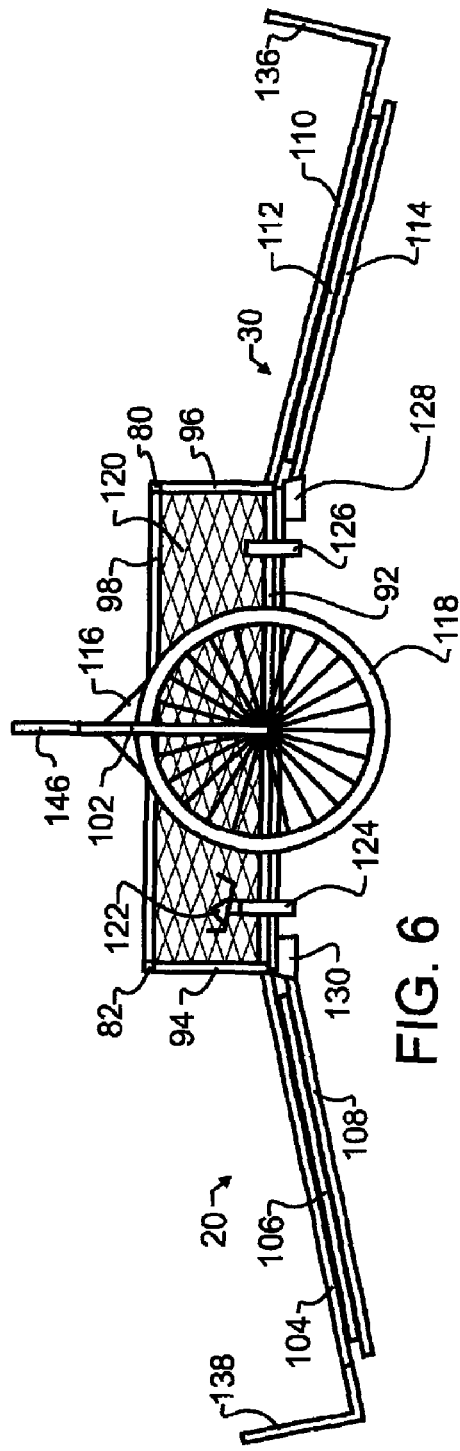
FIGS. 6 and 7 illustrate intermediate steps in the conversion of the preferred embodiment convertible deer cart configured in a utility cart geometry of FIG. 1 to a deer transport cart of FIG. 2 from side plan views.
Figure 7:
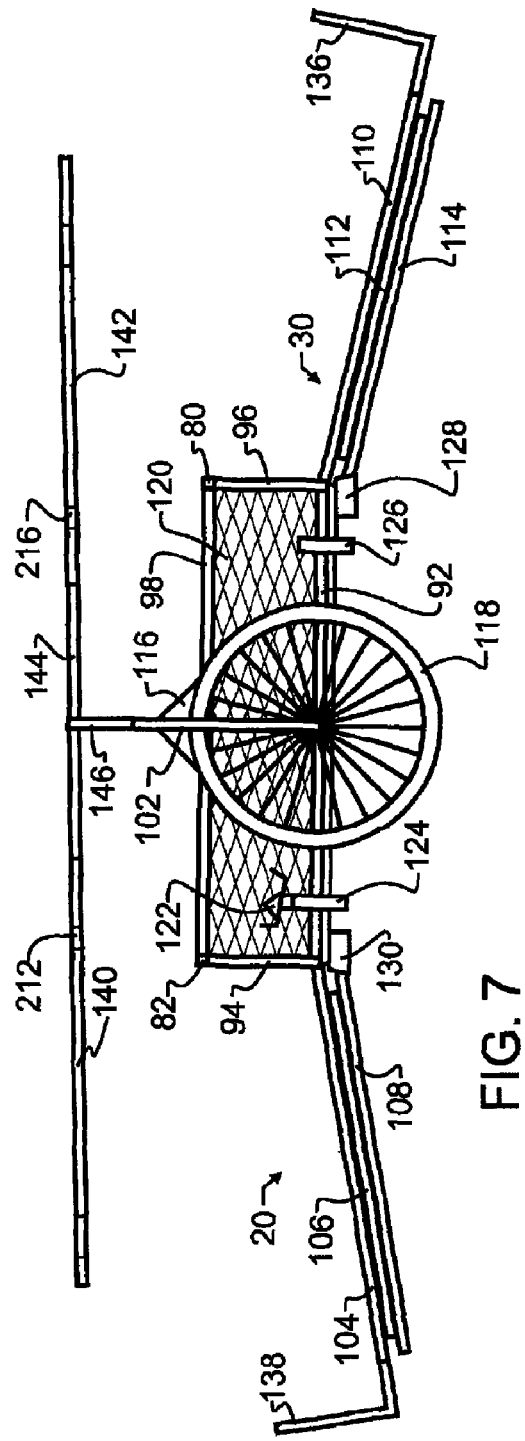
Figure 16:
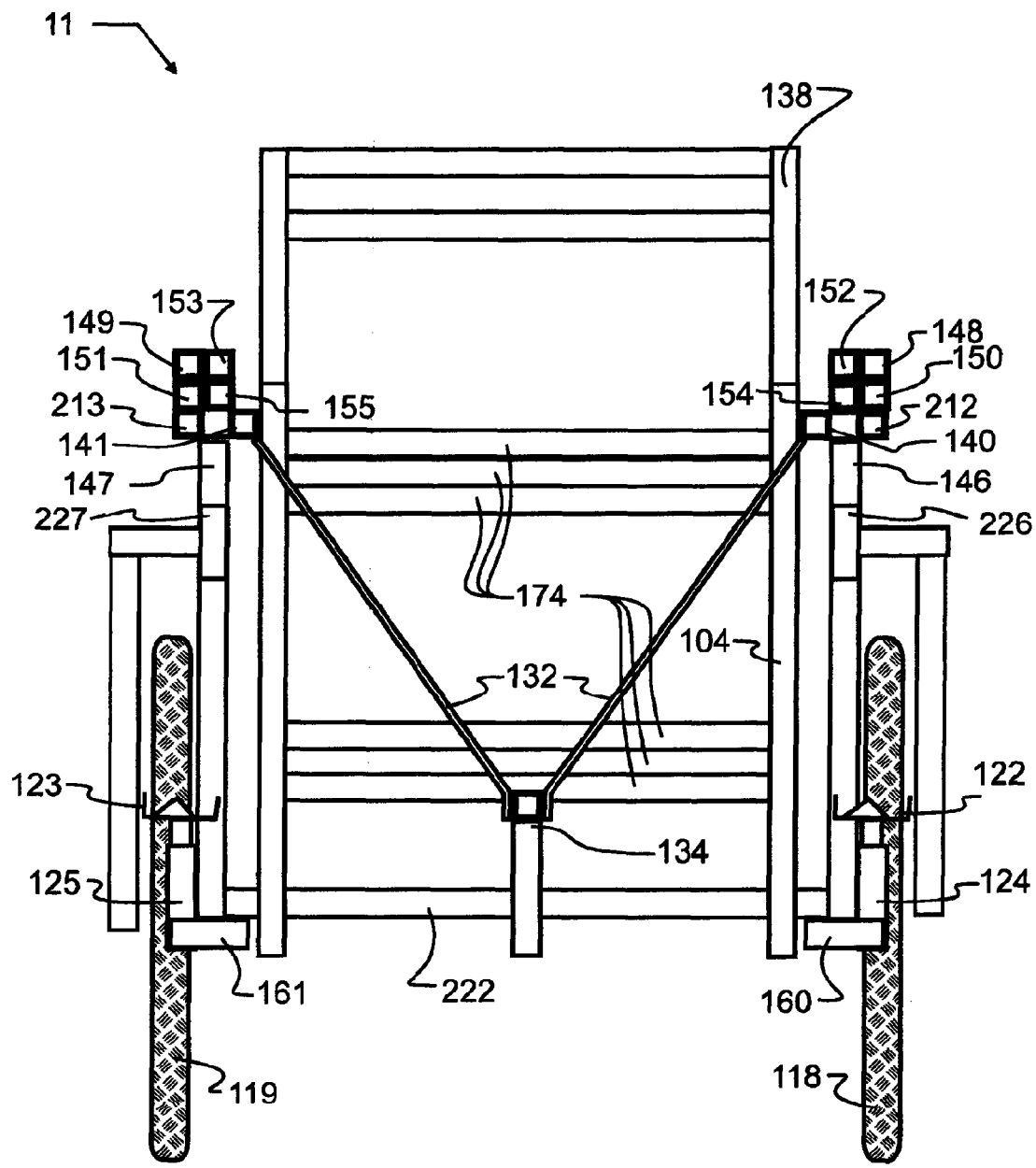
FIG. 16 illustrates the preferred embodiment convertible deer cart of FIG. 2 as configured to a deer transport cart geometry in accord with the teachings of the present invention from a front plan view.

FIG. 2 illustrates the preferred embodiment convertible deer cart of FIG. 1 reconfigured to a deer transport cart geometry 11. By way of the present illustrations and description pertaining thereto, the conversion of the present invention from one geometry to another is enabled by maintaining the numbering of identical components, so that a person reasonably skilled in the art may simply follow the movement of components as configuration geometries are changed. To reconfigure the deer transport cart geometry 11 from utility cart geometry 10, ladders 20, 30 are each pulled out from between wheels 118, 119, and then terminations 138, 136 may be rotated about their longitudinal axes as illustrated in FIG. 5, such that they now extend upward rather than downward as illustrated in FIG. 1. This may alternatively be achieved by flipping ladders 20, 30 about their longitudinal axis. Next, ladders 20, 30 at ladder segments 104, 110 are pinned pivotally adjacent to bed boundaries 222, 224, respectively. This leads to the arrangement visible in FIG. 6. Next, leg members 140, 142, 144 are coupled together, in the preferred embodiment at particular holes using the wire lock pins described herein above, to yield a predetermined length of the combined leg members 140, 142, 144 as shown in FIG. 7. The combined leg members 140, 142, 144 are then coupled directly to member 146 and fixedly coupled therewith. This stage of assembly is as illustrated in FIG. 7. Next, ladders 20, 30 are elevated, and coupled to leg members 140, 142, 144 to yield the arrangement of FIG. 2. To complete the deer transport cart geometry 11 of FIG. 2, tongue 134 may be coupled through bracing members 132 to ladder 20, and the few remaining unused components 148, 150 strapped using flaccid fasteners 214, 218 onto the coupled assembly of leg members 140, 142, 144. Deer transport cart geometry 11 does not require the use of tongue 134 and bracing members 132 when manually pushed or pulled. In fact, terminations 138, 136 serve as manual grasping points which may be used to either push or pull the preferred embodiment cart about. In this preferred embodiment, small protrusions 212, 216 are provided, which may for exemplary purposes be tubular components. Flaccid fasteners 214, 218, which may for exemplary purposes comprise hook and loop (Velcro™ or the like) straps, are securely affixed respectively to small protrusions 212, 216 by riveting or any other suitable fastening means. Once again, there are comparable components on the opposing side of the preferred embodiment cart, including protrusion 213 visible in FIG. 16.

Figure 8:
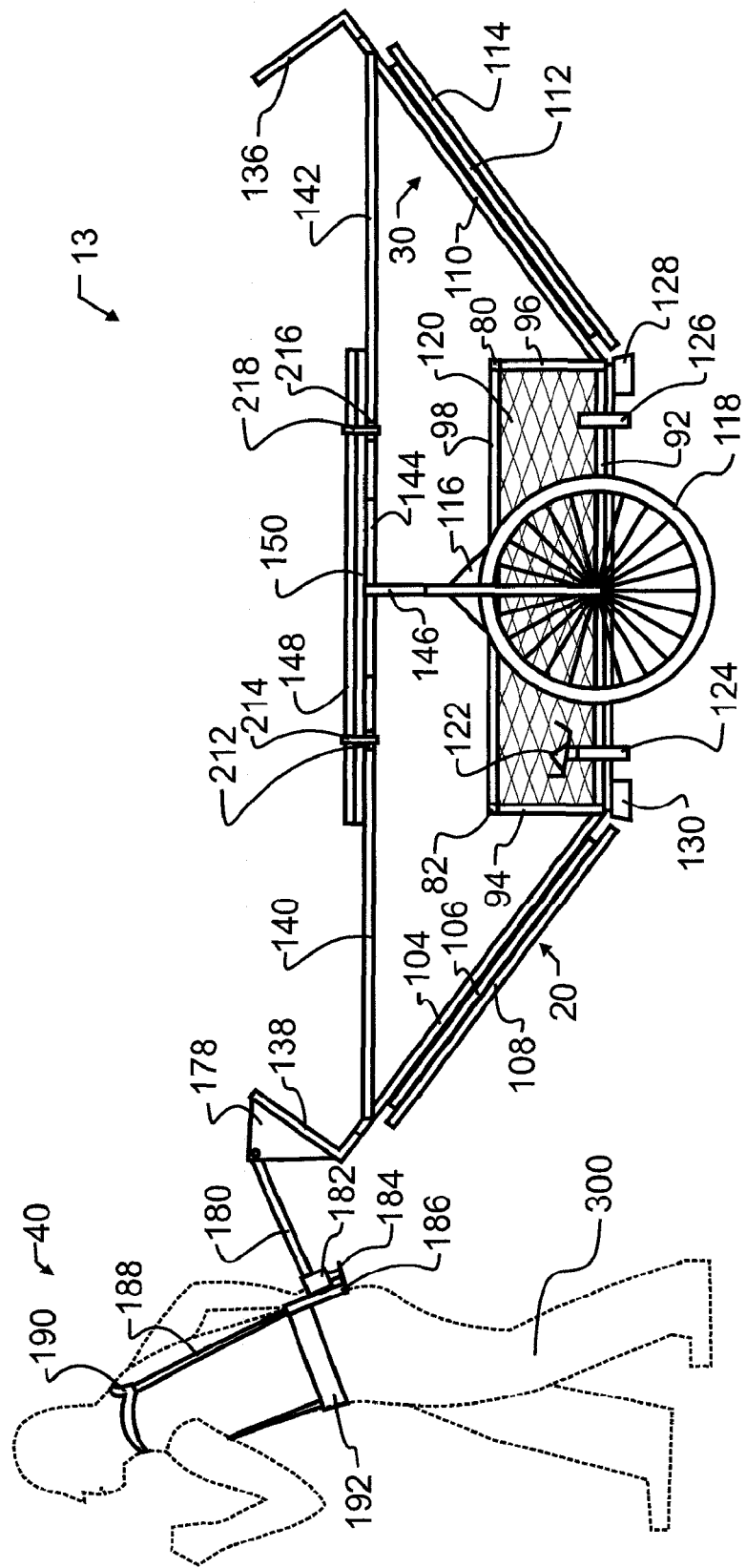
FIG. 8 illustrates the preferred embodiment convertible deer cart of FIG. 2 configured to a deer transport cart geometry in further combination with a preferred embodiment walking harness, in accord with the teachings of the present invention from a side plan view.

FIG. 8 illustrates the preferred embodiment convertible deer cart of FIG. 2 configured to a deer transport cart geometry 11 and in further combination with a preferred embodiment walking harness 40 to yield a harness pulled cart geometry 13. Harness 40, for exemplary purposes only, might include a shoulder strap 190, back strap 188, belt 192, each which are designed to securely engage person 300. An L-shaped bracket 186 supports ball 184, which most preferably resembles hitch balls in common use today coupling trailers to automobiles. This type of ball, in combination with suitable ball receiver 182, permits a wide range of relative angular displacement, while still maintaining L-shaped bracket 186 adjacent to extension 180 to thereby couple pushing or pulling movement from person 300 to termination 138. A suitable clamp or other type of coupler 178 is fastened to and preferably releasably clamps to termination 138. This harness pulled cart geometry 13 has much utility for a hunter who is on the move, but who wishes to be able to carry a firearm or other weapon in a ready position. In fact, person 300 may pivot relative to extension 180 nearly through a full circle, in the event game is spotted.

Figure 12:
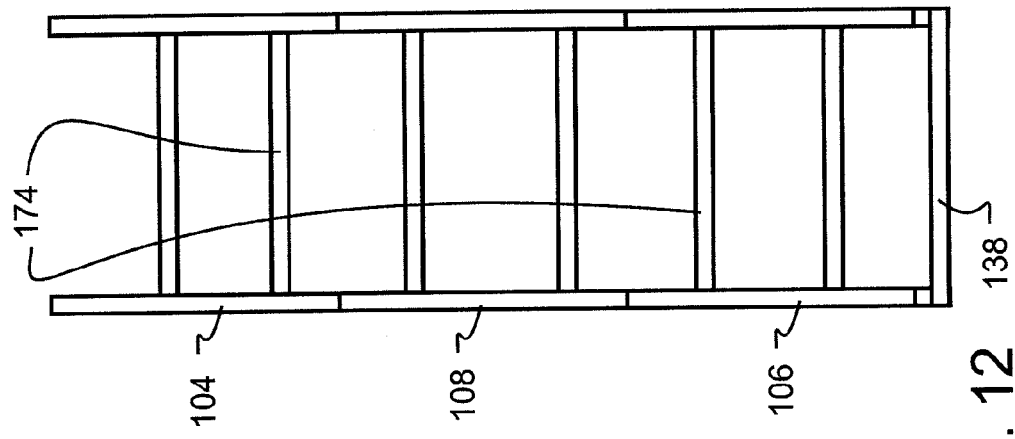
FIG. 12 illustrates front ladder 20 in a fully extended configuration of FIG. 11 and as found in FIG. 3 from a front plan view.
Figure 11:
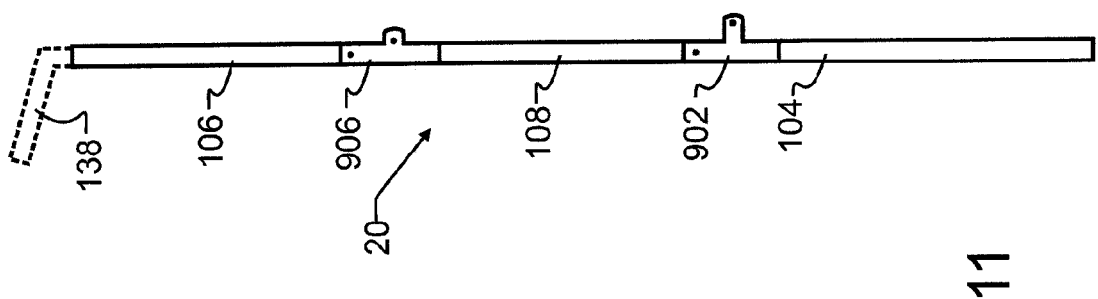

Conversion from deer transport cart geometry 11 to a free-standing deer stand geometry 12 illustrated in FIG. 3 requires the extension of ladders 20, 30, which is illustrated by the extension of front ladder 20 for exemplary purposes in the sequence of FIGS. 9-11. FIG. 9 illustrates a fully folded configuration such as found in FIGS. 1, 2 and 4-8, but in much greater detail. Through the alternative dashed lines, termination 138 is removed from ladder segment 104, and then ladder segment 108 is pivoted in the direction illustrated by arrow 900, ultimately into a coaxial alignment with ladder segment 104 as illustrated by FIG. 10. Bracket 902 nests about bracket 904, and, owing to the illustrated geometries, bracket 904 will stop against bracket 902 when ladder segment 108 is coaxial with ladder segment 104. Next, ladder segment 106 is unfolded as shown by arrow 1000, again pivoting bracket 908 within bracket 906 and ultimately bringing ladder segment 106 into coaxial alignment with ladder segments 104, 108, where bracket 908 will engage with and stop against bracket 906. Finally, termination 138 is placed into ladder segment 106 distal to ladder segment 108, to form a foot as may be best visible in FIG. 15. This fully extended configuration is shown by FIG. 11 from side view, and FIG. 12 from a front plan view. As evident in FIG. 12, each ladder segment 104-108 may carry any number of rungs 174 which are provided to facilitate a person climbing each ladder segment. Once extended, ladder 20 will be pivoted into engagement with stop 130, and ladder 30 will be pivoted into engagement with stop 128. Straps 194, 196 may be used through buckles 256, 258 to exert force on ladders 20, 30, keeping the ladders tightly engaged with stops 128, 130 and rigid therewith.

Figure 13:
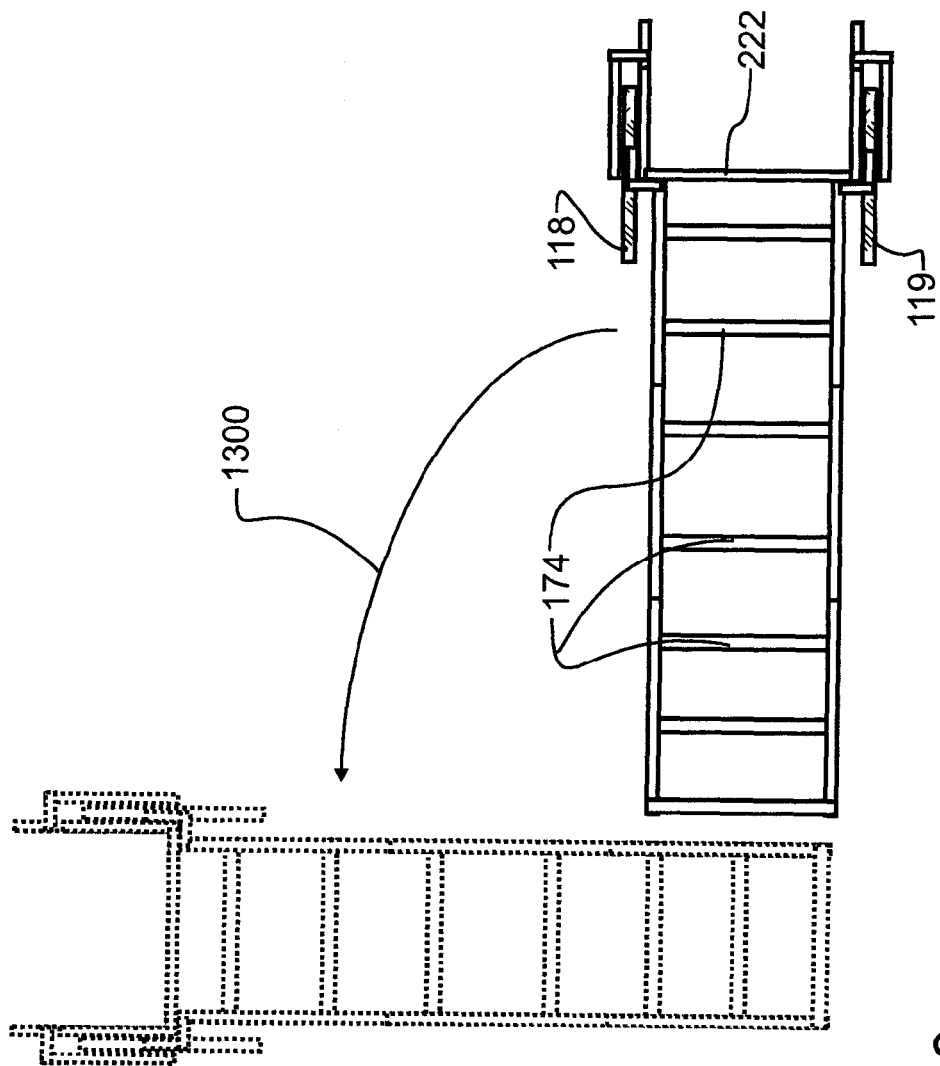
FIGS. 13 and 14 illustrate several intermediate steps in the progression of the preferred embodiment convertible deer cart from a deer transport cart configuration as illustrated in FIG. 2 to a free-standing deer stand geometry such as illustrated in FIG. 3, each from simplified front plan view, and illustrating alternative, progressive positions by dashed line.
Figure 14:
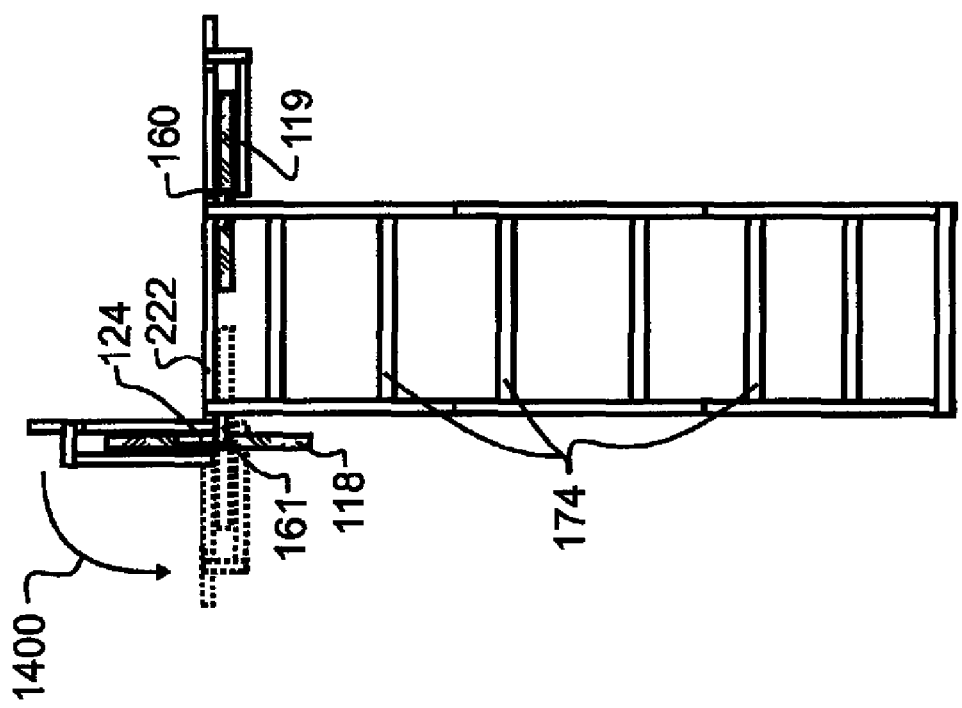

FIGS. 13 and 14 illustrate several intermediate steps in the progression of the preferred embodiment convertible deer cart from a deer transport cart geometry 11 as illustrated in FIG. 2 to a free-standing deer stand geometry 12 as illustrated in FIG. 3, each from simplified front plan view, and illustrating alternative, progressive positions by dashed line. The order of sequence between FIGS. 13 and 14 is not critical to the operation of the present invention. In other words, the rearrangements of FIG. 14 may be made either before or after those of FIG. 13. As FIG. 13 illustrates, once ladders 20, 30 are extended and locked, through the motion shown by arrow 1300 the preferred embodiment convertible deer cart may be stood up into vertical position. FIG. 14 illustrates the pivoting of wheel assemblies in the direction of arrow 1400 about riser members 124, 125, 126, and the fourth riser, not illustrated, each which may be pinned (and therefore pivotal about the pin longitudinal axis) with members 160-163.

To finish the conversion, leg members 140, 142, 144 and leg members 141, 143, 145 are adjusted to a second predetermined length through pin holes, and are then coupled to members 146, 147, respectively. Feet 122, 123 are placed to terminate the leg members. Seat base 168 and back 170 are mounted upon pedestal 172, and the framework 148, 150, 154 may then be inserted into pockets 80, 82, and like pockets on the opposed side panel which are not visible in the illustrations, and then assembled to form a railing which may optionally serve as a gun rest.

Figure 15:
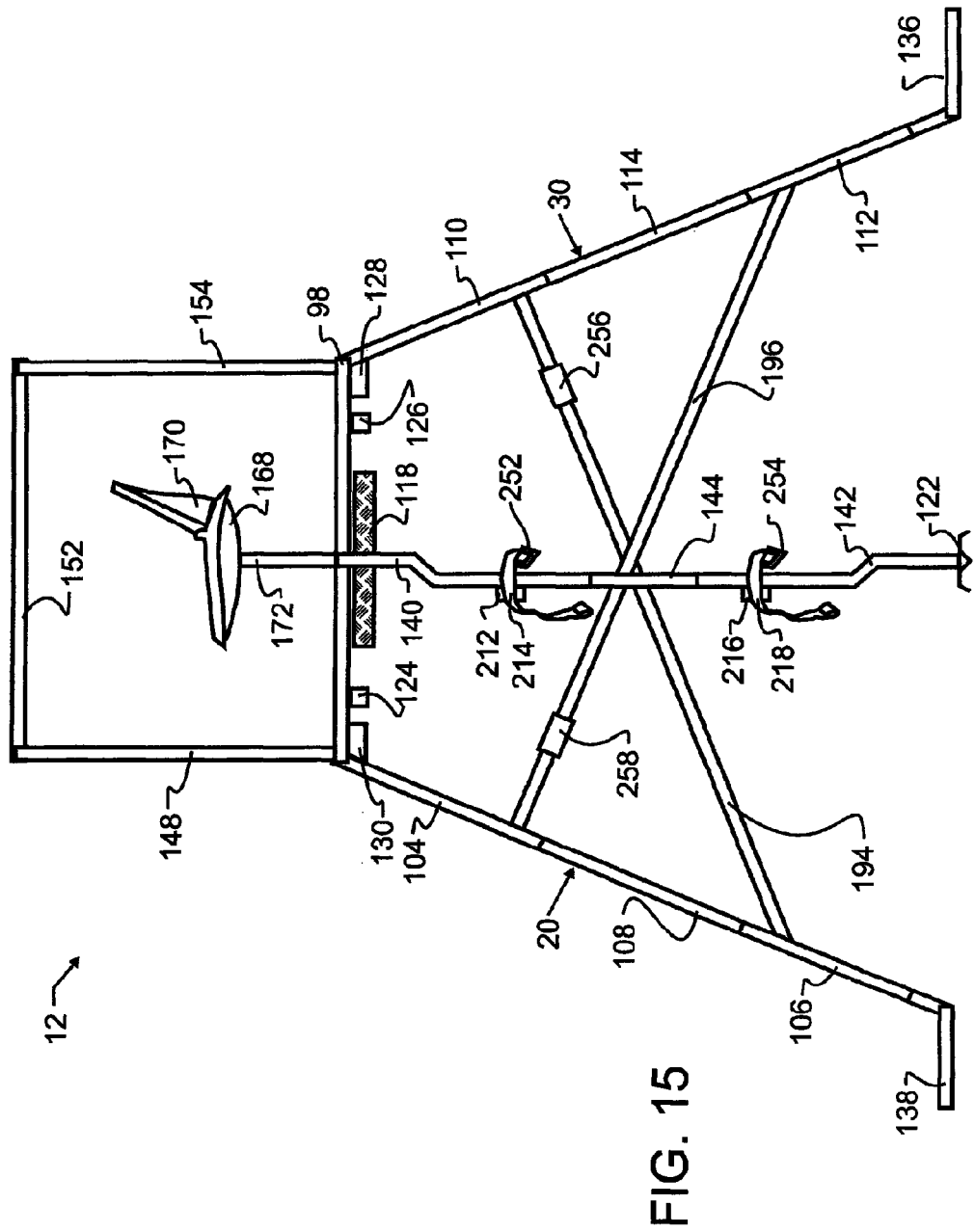
FIG. 15 illustrates the preferred embodiment convertible deer cart of FIG. 3 as configured to a free-standing deer stand geometry in accord with the teachings of the present invention from a side plan view, and further including stabilizing straps.

The preferred embodiment convertible deer cart may be manufactured from a variety of materials, including metals, resins and plastics, ceramics or cementitious materials, or even combinations or composites of the above. The specific material used may vary, though special benefits are attainable if several important factors are taken into consideration. Firstly, the apparatus preferably will should be sufficiently light to enable more convenient transport, but must maintain sufficient strength to support a person upon seat bottom 168 in normal use when in the free-standing deer stand geometry 12 as illustrated in FIGS. 3 and 15. Most preferably, the preferred embodiment convertible deer cart will also be weather resistant and sufficiently durable to withstand the particular climate for the intended application, including any forces that may be applied that could tend to fracture or shear any components used therein. In the preferred embodiment, ordinary carbon still may be powder coated, dip coated, painted, or otherwise treated. More expensive metal alloys may, of course, also be used, but cost will be of consideration. Metal alloys will include all metal alloys that are suitable, with aluminum and stainless steel being merely exemplary.

In consideration of the various alternative geometries 10-12 illustrated herein, the incorporation of color coding, dots, labels or other indicia on or adjacent to coupled components to illustrate proper placement of pins and components is further contemplated herein. Such indicia may be used as appropriate to facilitate the reconfiguration of the preferred embodiment into any of the various geometries.

While the foregoing details what is felt to be the preferred embodiment of the invention, no material limitations to the scope of the claimed invention are intended. Further, features and design alternatives that would be obvious to one of ordinary skill in the art are considered to be incorporated herein. The scope of the invention is set forth and particularly described in the claims herein below.

We claim:

1. A wheeled and convertible deer cart, comprising:
a receptacle body having a bed and side walls that extend generally perpendicular to said bed in a first configuration defining a utility cart and a second configuration defining a deer cart larger than said first configuration, and said side walls pivotal to extend generally parallel to said bed in a third configuration defining a stand;
laterally spaced wheels coupled with and operatively supporting said receptacle body in said first and second configurations;
a pair of ladders received within said bed in said first configuration, said pair of ladders pivotal and spaced distally at opposed ends of said bed in said second configuration and also in said third configuration, and said ladders compacted in said second configuration and extended in said third configuration; and
at least two longitudinally extensive leg members that in said third stand configuration extend from a first end adjacent a ground surface to a second end distal to said first end that supports said bed above said ground surface, and that in said second deer cart configuration are coupled at distal ends to said ladders to maintain an end of each of said pair of ladders that is distal to said bed elevated above said bed, and in combination therewith generally define an upper cart circumference.

2. The wheeled and convertible deer cart of claim 1, further comprising a tongue coupled with said receptacle body and with a tow coupler.

3. The wheeled and convertible deer cart of claim 2, further comprising a human harness having a ball extending therefrom and engaged with said tow coupler, said wheeled and convertible deer cart thereby stabilized and hand-propelled by a human attendant.

4. The wheeled and convertible deer cart of claim 2, wherein said tow coupler is further articulated with a towing vehicle.

5. The wheeled and convertible deer cart of claim 1, further comprising a ladder termination removable from said pair of ladders and extending generally perpendicular thereto.

* * * * *

UNITED STATES PATENT AND TRADEMARK OFFICE
CERTIFICATE OF CORRECTION

| | | |
|---|---|---|
| PATENT NO. | : 8,256,794 B1 | Page 1 of 1 |
| APPLICATION NO. | : 13/171409 | |
| DATED | : September 4, 2012 | |
| INVENTOR(S) | : Roger A. Burton et al. | |

It is certified that error appears in the above-identified patent and that said Letters Patent is hereby corrected as shown below:

On the Title page insert item [60]:
--Related Application Data
Division of application No. 12/141,038, filed on June 17, 2008, now Pat. No. 7,967,325.--

Signed and Sealed this
Twenty-third Day of April, 2013

Teresa Stanek Rea
*Acting Director of the United States Patent and Trademark Office*